(12) United States Patent
Zhang et al.

(10) Patent No.: US 12,548,332 B2
(45) Date of Patent: Feb. 10, 2026

(54) CASCADE STAGE BOUNDARY AWARENESS NETWORKS FOR SURGICAL WORKFLOW ANALYSIS

(71) Applicant: DIGITAL SURGERY LIMITED, London (GB)

(72) Inventors: Jinglu Zhang, Bournemouth (GB); Abdolrahim Kadkhodamohammadi, London (GB); Imanol Luengo Muntion, London (GB); Danail V. Stoyanov, London (GB); Santiago Barbarisi, London (GB)

(73) Assignee: DIGITAL SURGERY LIMITED, London (GB)

( * ) Notice: Subject to any disclaimer, the term of this patent is extended or adjusted under 35 U.S.C. 154(b) by 386 days.

(21) Appl. No.: 18/130,445

(22) Filed: Apr. 4, 2023

(65) Prior Publication Data

US 2023/0326207 A1    Oct. 12, 2023

Related U.S. Application Data

(60) Provisional application No. 63/328,712, filed on Apr. 7, 2022.

(51) Int. Cl.
*G06V 20/40*       (2022.01)
*G06V 10/82*       (2022.01)
*G16H 30/40*       (2018.01)

(52) U.S. Cl.
CPC .............. *G06V 20/41* (2022.01); *G06V 10/82* (2022.01); *G06V 20/46* (2022.01); *G16H 30/40* (2018.01); *G06V 2201/03* (2022.01)

(58) Field of Classification Search
CPC ........ G06V 20/41; G06V 10/82; G06V 20/46; G06V 2201/03; G06V 10/7792; G06V 10/809; G06V 20/44; G06V 40/00; G06V 40/20; G06V 40/70; G16H 30/40; G06F 18/256

See application file for complete search history.

(56) References Cited

U.S. PATENT DOCUMENTS

| 10,791,301 | B1* | 9/2020 | Garcia Kilroy ........ G11B 27/10 |
| 2020/0349711 | A1* | 11/2020 | Duke ..................... G06N 3/045 |
| 2020/0405406 | A1* | 12/2020 | Harris ..................... A61B 46/40 |
| 2022/0076115 | A1* | 3/2022 | Nam ..................... G06N 3/0495 |

(Continued)

OTHER PUBLICATIONS

Lei et al, ("Temporal Deformable Residual Networks for Action Segmentation in Videos", 2018 IEEE/CVF Conference on Computer Vision and Pattern Recognition, pp. 4742-4751) (Year: 2018).*

(Continued)

*Primary Examiner* — Amara Abdi
(74) *Attorney, Agent, or Firm* — CANTOR COLBURN LLP

(57) ABSTRACT

Techniques are described for improving computer-assisted surgical (CAS) systems, particularly, to recognize surgical phases in a video of a surgical procedure. A CAS system includes cameras that provide video stream of a surgical procedure. According to one or more aspects the surgical phases are automatically detected in the video stream using a machine learning model. Particularly, the machine learning model includes a boundary aware cascade stage network to perform surgical phase recognition.

18 Claims, 6 Drawing Sheets

(56) References Cited

U.S. PATENT DOCUMENTS

2022/0160433 A1* 5/2022 Rafii-Tari ........... A61B 17/3403
2022/0296334 A1* 9/2022 Fathollahi Ghezelghieh ..............
G06N 3/09

OTHER PUBLICATIONS

Beatrice Van Amsterdam et al., "Gesture Recognition in Robotic Surgery: A Review", arxiv.org, Jan. 29, 2021, 15 pages.
Extended European Search Report for Application No. 23166760.1-1207; Mailing Date: Aug. 24, 2023; 13 pages.
Odysseas Zisimopoulos et al., "DeepPhase: Surgical Phase Recognition in Cataracts Videos", arxiv.org, Jul. 17, 2018, 8 pages.
Peng Lei et al, "Temporal Deformable Residual Networks for Action segmentation in Videos", IEEE CVF Conference on Computer Vision and Pattern Recognition, Jun. 18, 2018, 10 pages.
Tobias Czempiel et al., "TeCNO: Surgical Phase Recognition with Multi-Stage Temporal Convolutional Networks", arxiv.org, Mar. 24, 2020, 10 pages.
Tobias Ross et al., "Exploiting the potential of unlabeled endoscopic video data with self-supervised learning", Inter. Journal of Computer Assisted Radiology and Surbery, Apr. 27, 2018, Springer, 9 pages.
Kinpeng Ding et al., "Exploring Segment-level Semantics for Online Phase Recognition from Surgical Videos" arxiv.org, Mar. 20, 2022, 11 pages.
Zhang, Jinglu et al., "Self-Knowledge Distillation for Surgical Phase Recognition", arxiv.org, Jun. 15, 2023, pp. 1-13.
Farha et al., "MS-TCN: Multi-Stage Temporal Convolutional Network for ActionSegmentation", Proceedings of the IEEE/CVF Conference on Computer Vision and PatternRecognition, 2019; 10 pages.
Hu et al., "Squeeze-and-Excitation Networks", Proceedings of the IEEEconference on computer vision and pattern recognition, 2018; 13 pages.
Wang et al, "Boundary-Aware Cascade Networks for Temporal Action Segmentation", European Conference on Computer Vision. Springer, Cham, 2020.; 17 pages.

* cited by examiner

CASCADE STAGE BOUNDARY AWARENESS NETWORKS FOR SURGICAL WORKFLOW ANALYSIS

CROSS-REFERENCE TO RELATED APPLICATIONS

This application claims the benefit of U.S. Provisional Application No. 63/328,712, filed Apr. 7, 2022, the disclosure of which is incorporated herein by reference in its entirety.

BACKGROUND

The present disclosure is generally related to computing technology and particularly to improvements to computer-assisted surgical systems that facilitate surgical phase recognition based on video data and machine learning.

Computer-assisted surgery (CAS) includes the use of computer technology for surgical planning and for guiding or performing surgical interventions. CAS, in some aspects, can include or lead to robotic surgery. Robotic surgery can include a surgical instrument that performs one or more actions in relation to an action performed by medical personnel, such as a surgeon, an assistant, a nurse, etc. Alternatively, or in addition, the surgical instrument can be part of a supervisory-controlled system that executes one or more actions in a pre-programmed or pre-trained manner. Alternatively, or in addition, the medical personnel manipulate the surgical instrument in real-time. In yet other examples, the medical personnel carry out one or more actions via a platform that provides controlled manipulations of the surgical instrument based on the personnel's actions.

BRIEF DESCRIPTION

According to one or more aspects, a system includes a memory device and one or more processors coupled with the memory device. One or more processors are configured to encode a frame of a video of a surgical procedure into a plurality of features, provide the features to a boundary supervision branch of a model, provide the features to a cascade of temporal stages of the model, and perform fusion of an output of the cascade of temporal stages with an output of the boundary supervision branch to predict a surgical phase of the surgical procedure depicted in the frame.

According to one or more aspects, a computer-implemented method includes identifying, autonomously, a surgical phase in a video of a surgical procedure using a boundary aware cascade stage network to perform surgical phase recognition.

According to one or more aspects, a computer program product includes a memory device with computer-readable instructions stored thereon, where executing the computer-readable instructions by one or more processing units causes the one or more processing units to identify, autonomously, a surgical phase in a video of a surgical procedure using a boundary aware cascade stage network to perform surgical phase recognition and an encoder trained using self-supervised learning.

Additional technical features and benefits are realized through the techniques of the present invention. Aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the aspects of the invention are apparent from the following detailed description taken in conjunction with the accompanying drawings in which:

DETAILED DESCRIPTION

Exemplary aspects of technical solutions described herein relate to, among other things, devices, systems, methods, computer-readable media, techniques, and methodologies for using machine learning and computer vision to improve computer-assisted surgical systems. In one or more aspects, structures, such as anatomical structures, surgical instruments, and other artifacts, are predicted dynamically and substantially in real-time as the surgical data is being captured and analyzed by technical solutions described herein. Exemplary aspects of technical solutions described herein further facilitate generating augmented views of surgical sites using semantic surgical representations based on predictions of phases and one or more structures in the surgical data. Further, exemplary aspects of technical solutions described herein include providing user feedback, such as post-operative analysis of a surgical procedure. Some exemplary aspects of technical solutions described herein include providing guidance to the surgeon(s) or medical personnel during a surgical procedure.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describe having a communications path between two elements and do not imply a direct connection between the elements with no intervening elements/connections between them. All of these variations are considered a part of the specification.

Figure 1:
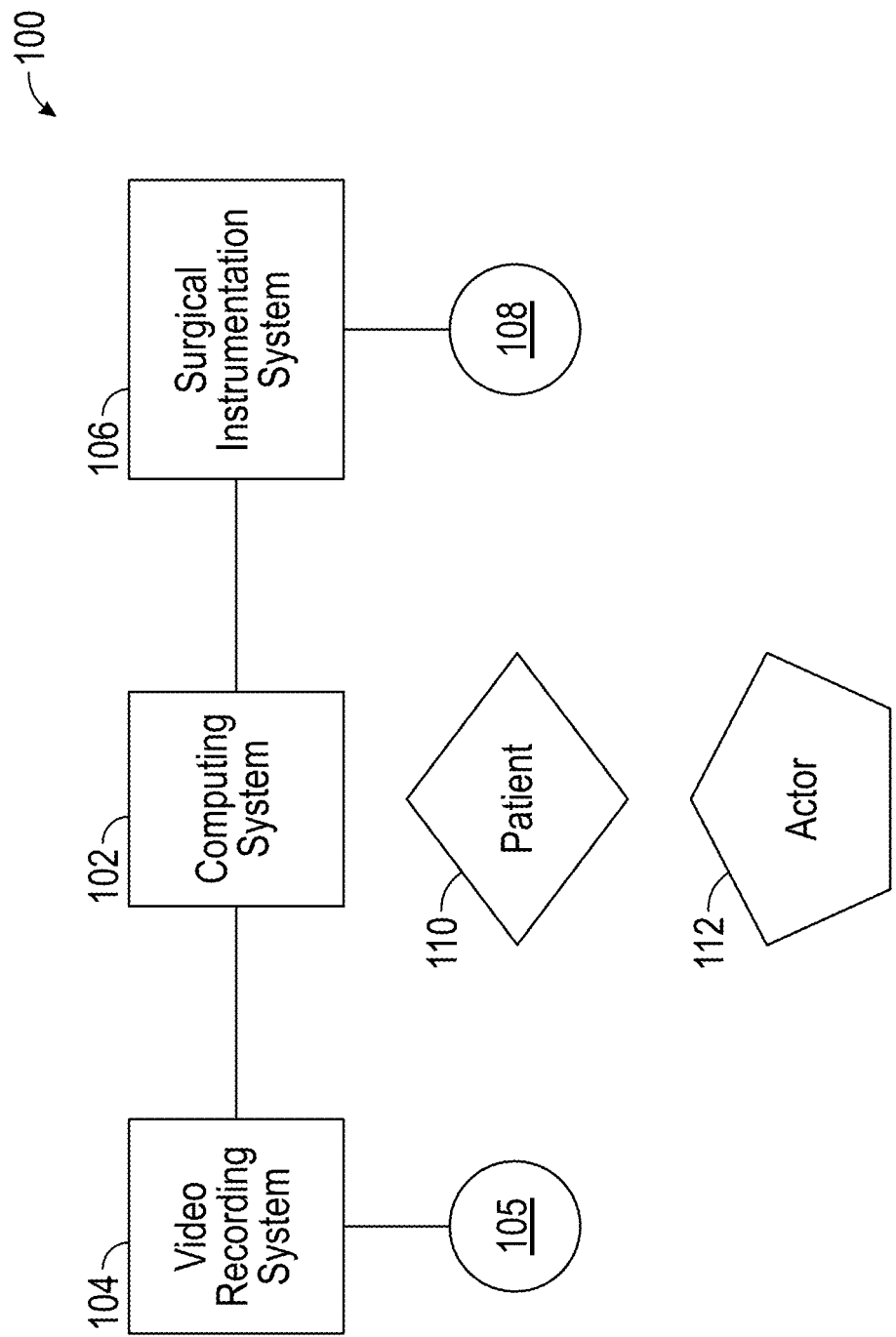
FIG. 1 shows a system according to one or more aspects.

FIG. 1 depicts an example CAS system 100 according to one or more aspects. The CAS system 100 includes at least a computing system 102, a video recording system 104, and a surgical instrumentation system 106. The computing system 102 can include one or more instances of the computer system 800 of FIG. 7.

Actor 112 can be medical personnel that uses the CAS system 100 to perform a surgical procedure on a patient 110. Medical personnel can be a surgeon, assistant, nurse, administrator, or any other actor that interacts with the CAS system 100 in a surgical environment. The surgical procedure can be any type of surgery, such as but not limited to cataract surgery, laparoscopic cholecystectomy, endoscopic endonasal transsphenoidal approach (eTSA) to resection of pituitary adenomas, or any other surgical procedure. In other examples, actor 112 can be a technician, an administrator, an engineer, or any other such personnel that interacts with the CAS system 100. For example, actor 112 can record data from the CAS system 100, configure/update one or more attributes of the CAS system 100, review past performance of the CAS system 100, repair the CAS system 100, etc.

A surgical procedure can include multiple phases, and each phase can include one or more surgical actions. A "surgical action" can include an incision, a compression, a stapling, a clipping, a suturing, a cauterization, a sealing, or any other such actions performed to complete a phase in the surgical procedure. A "phase" represents a surgical event that is composed of a series of steps (e.g., closure). A "step" refers to the completion of a named surgical objective (e.g., hemostasis). During each step, certain surgical instruments 108 (e.g., forceps) are used to achieve a specific objective by performing one or more surgical actions.

The surgical instrumentation system 106 provides electrical energy to operate one or more surgical instruments 108 to perform the surgical actions. The electrical energy triggers an activation in the surgical instrument 108. The electrical energy can be provided in the form of an electrical current or an electrical voltage. The activation can cause a surgical action to be performed. The surgical instrumentation system 106 can further include electrical energy sensors, electrical impedance sensors, force sensors, bubble and occlusion sensors, and various other types of sensors. The electrical energy sensors can measure and indicate an amount of electrical energy applied to one or more surgical instruments 108 being used for the surgical procedure. The impedance sensors can indicate an amount of impedance measured by the surgical instruments 108, for example, from the tissue being operated upon. The force sensors can indicate an amount of force being applied by the surgical instruments 108. Measurements from various other sensors, such as position sensors, pressure sensors, flow meters, can also be input.

The video recording system 104 includes one or more cameras 105, such as operating room cameras, endoscopic cameras, etc. The cameras 105 capture video data of the surgical procedure being performed. The video recording system 104 includes one or more video capture devices that can include cameras placed in the surgical room to capture events surrounding (i.e., outside) the patient being operated upon. The video recording system 104 further includes cameras that are passed inside (e.g., endoscopic cameras) the patient to capture endoscopic data. The endoscopic data provides video and images of the surgical procedure.

The computing system 102 includes one or more memory devices, one or more processors, a user interface device, among other components. The computing system 102 can execute one or more computer-executable instructions. The execution of the instructions facilitates the computing system 102 to perform one or more methods, including those described herein. The computing system 102 can communicate with other computing systems via a wired and/or a wireless network. In one or more examples, the computing system 102 includes one or more trained machine learning models that can detect and/or predict features of/from the surgical procedure that is being performed or has been performed earlier. Features can include structures such as anatomical structures, surgical instruments 108 in the captured video of the surgical procedure. Features can further include events such as phases, actions in the surgical procedure. Features that are detected can further include actor 112, patient 110. Based on the detection, the computing system 102, in one or more examples, can provide recommendations for subsequent actions to be taken by actor 112. Alternatively, or in addition, the computing system 102 can provide one or more reports based on the detections. The detections by the machine learning models can be performed in an autonomous or semi-autonomous manner.

The machine learning models can include artificial neural networks, such as deep neural networks, convolutional neural networks, recurrent neural networks, encoders, decoders, or any other type of machine learning models. The machine learning models can be trained in a supervised, unsupervised, or hybrid manner. The machine learning models can be trained to perform detection and/or prediction using one or more types of data acquired by the CAS system 100. For example, the machine learning models can use the video data captured via the video recording system 104. Alternatively, or in addition, the machine learning models use the surgical instrumentation data from the surgical instrumentation system 106. In yet other examples, the machine learning models use a combination of video data and surgical instrumentation data.

Additionally, in some examples, the machine learning models can also use audio data captured during the surgical procedure. The audio data can include sounds emitted by the surgical instrumentation system 106 while activating one or more surgical instruments 108. Alternatively, or in addition, the audio data can include voice commands, snippets, or dialog from one or more actors 112. The audio data can further include sounds made by the surgical instruments 108 during their use.

In one or more examples, the machine learning models can detect surgical actions, surgical phases, anatomical structures, surgical instruments, and various other features from the data associated with a surgical procedure. The detection can be performed in real-time in some examples. Alternatively, or in addition, the computing system 102 analyzes the surgical data, i.e., the various types of data captured during the surgical procedure, in an offline manner (e.g., post-surgery). In one or more examples, the machine learning models detect surgical phases based on detecting some of the features such as the anatomical structure, surgical instruments, etc.

The development of intelligent context-aware CAS 100 significantly improves the safety and quality of modern operating rooms (ORs). Particularly, in such CAS 100, recognition of surgical phase recognition enables partitioning complex surgical procedures into well-defined surgical steps and more granular analysis of surgical workflows. This paves the way towards standardization of surgical workflows and identification of best practices, providing intraoperative context-aware assistive information, and improving team coordination in the OR. Surgical workflow recognition, which includes surgical phase recognition, has therefore become an active field of research. Most of the effort has been focused on vision-based approaches as videos are less invasive to collect, and moreover, videos are inherently available in case of minimally invasive surgery. However, a robust and efficient video-based surgical phase recognition is a technical challenge considering the large amount of data that has to be analyzed, the unique challenges of computer vision, with added technical challenges of detecting surgery-specific features such as anatomy and instruments.

Figure 2:
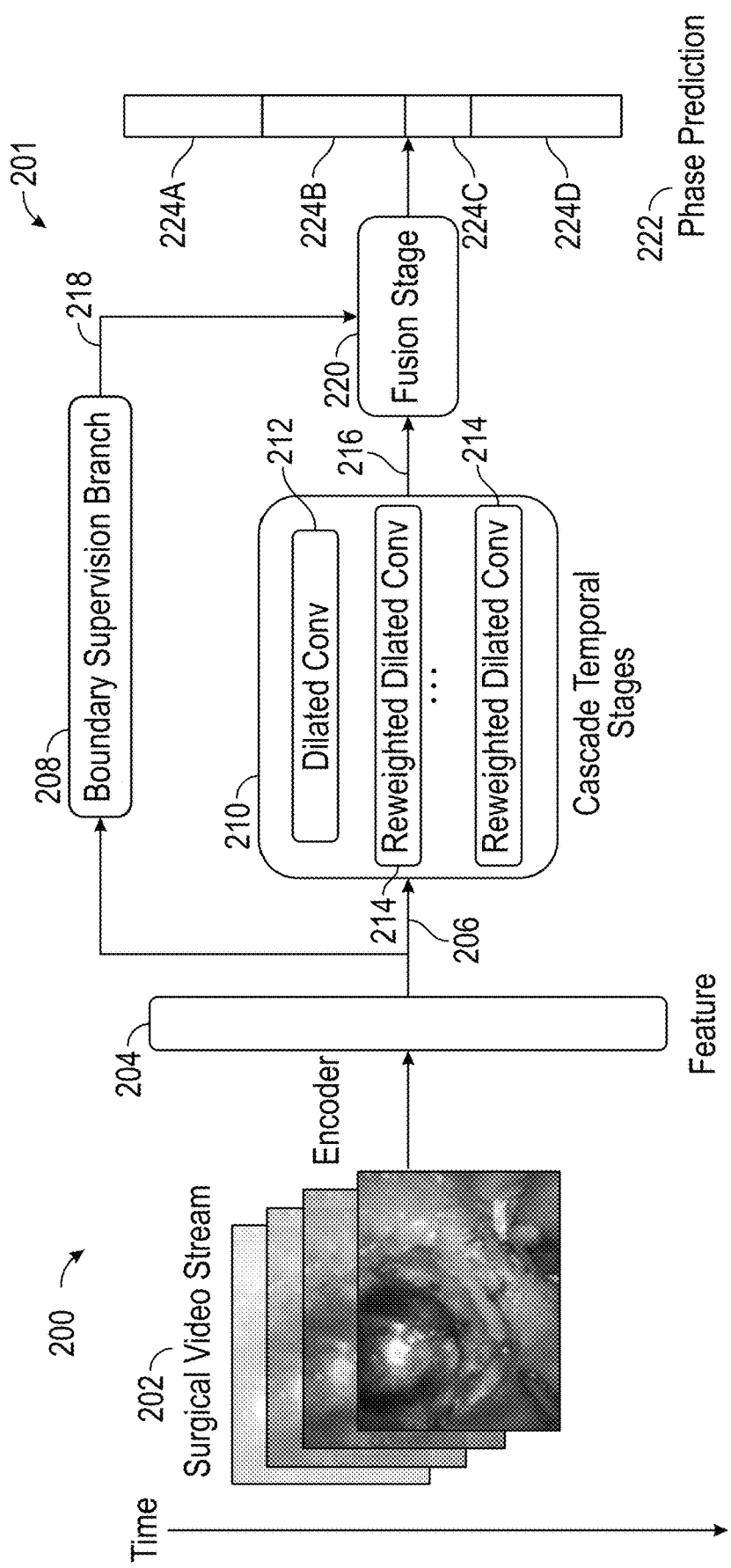
FIG. 2 depicts a flow diagram according to one or more aspects.

FIG. 2 depicts a flow diagram for a video-based phase recognition system 200 (also referred to as system 200) according to one or more examples. The video-based phase recognition system 200 receives a video stream of a surgical procedure, for example, from an endoscopic camera. The video-based phase recognition system 200 predicts a surgical phase that is captured in the input video stream. As the input video stream changes (e.g., different actions are performed in the surgical procedure), the predicted surgical phase can also change (depending on the action being performed).

The video-based phase recognition system 200 can use two-stage machine learning to train a model 201. Aspects of the technical solutions described herein can be implemented using any techniques known now or developed later to build robust representations for video frames.

Technical solutions are described herein to address such technical challenges in the video-based surgical phase recognition. Surgical phase recognition can include dividing a surgical video into chunks corresponding to surgical objectives, which assists with holistic surgical video understanding and intraoperative surgical assistance. However, identifying phase labels from untrimmed surgical videos can be a challenging task caused, at least in part, by ambiguous boundaries and sudden label changes. Ambiguous boundaries can have gradual transition of visual features but sudden label changes. Sudden label changes can occur during a phase interval, for example, where a surgeon needs to change an instrument in the middle of a phase while the phase label remains unchanged, which may lead to over-segmentation.

The technical solutions described herein use a boundary aware cascade stage network to perform a surgical phase recognition task. Taking a surgical video as input, spatial features can be extracted using a pre-trained encoder (e.g., senet154) or other custom-trained encoder, and latent features can be fed to a temporal decoder. A temporal model (e.g., model 201) can include two or more branches, such as cascade temporal stages and a boundary supervision branch. Cascade temporal stages can incorporate a backbone model, such as multi-stage temporal convolutional network for action segmentation. The model can adjust a weight for every frame based on a confidence score from a previous stage such that later stages focus more on ambiguous frames near phase transitions or in sudden actions. The boundary supervision branch can predict action boundaries and apply an adaptive pooling strategy to alleviate over-segmentation errors.

In the flow diagram depicted in FIG. 2, a surgical video stream 202 includes a plurality of frames of video of a surgical procedure. An encoder 204 can encode frames of the video of the surgical procedure into a plurality of features 206. The features 206 can be provided to a boundary supervision branch 208 of the model 201. The features 206 can also be provided to a cascade of temporal stages 210 of the model 201. The cascade of temporal stages 210 can include a dilated convolution stage 212 in series with one or more reweighted dilated convolution stages 214. An output 216 of the cascade of temporal stages 210 can be used with an output 218 of the boundary supervision branch 208 to predict a surgical phase of the surgical procedure depicted in the frame of the surgical video stream 202 at fusion stage 220. The output 218 of the boundary supervision branch 208 can be a confidence prediction of a boundary probability to fuse with a phase prediction of the output 216 of the cascade of temporal stages 210. Surgical phase prediction 222 can identify a surgical phase 224 from a plurality of surgical phases 224 based on the training provided to the model 201. In the example of FIG. 2, the phase prediction 222 predicts whether the frame from the surgical video stream 202 represents surgical phases 224A, 224B, 224C, 224D, etc.

Figure 4:
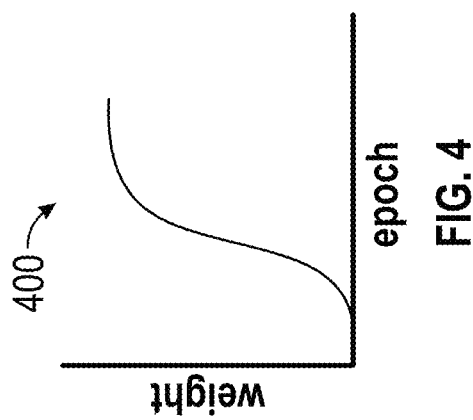
FIG. 4 depicts a weighting function according to one or more aspects.

In aspects, the boundary supervision branch 208 can be trained in parallel with the cascade of temporal stages 210 according to a loss function that changes over a plurality of epochs. As one example, the loss function can tune weights of both the boundary supervision branch 208 and the cascade of temporal stages 210 together. For instance, the loss function can be in the form of $L=\alpha*L1+\lambda*L2$, where L1 is a contribution of the cascade of temporal stages 210, $\alpha$ is a weight to apply to L1, L2 is a contribution of the boundary supervision branch 208, and $\lambda$ is a weight to apply to L2. As one example, the values of $\alpha$ and $\lambda$ can vary over multiple epochs of training, such as apply a weighting function 400 of FIG. 4, where lower values of $\lambda$ with higher values of $\alpha$ are initially used, and the value of $\lambda$ is increased over multiple epochs to gradually increase the influence of the boundary supervision branch 208. Training data can be expert labeled surgical phase data to assist in distinguishing transition events and phase determination. This approach can result in faster and more accurate training of the model 201 as opposed to first training the boundary supervision branch 208 and then training the cascade of temporal stages 210. Alternatively, the weight applied to training for the contribution of the boundary supervision branch 208 can start with a higher value, and the weight applied to the contribution of the cascade of temporal stages 210 can be increased over multiple epochs. The number of layers included in the cascade of temporal stages 210 can be determined experimentally as training results are compared. As one example, the cascade of temporal stages 210 can include about 5 stages with about 10 layers.

As one example, results have validated the processes as described herein on both an internal Partial Nephrectomy (PN) dataset and a publicly available Cholec80 dataset. As compared to a baseline approach of a multi-stage temporal convolutional network for action segmentation, the boundary aware cascade stage network approach can improve accuracy and F1 scores for multiple datasets. The boundary aware cascade stage network can allow focusing on harder frames and reducing over-segmentation errors.

Figure 3:
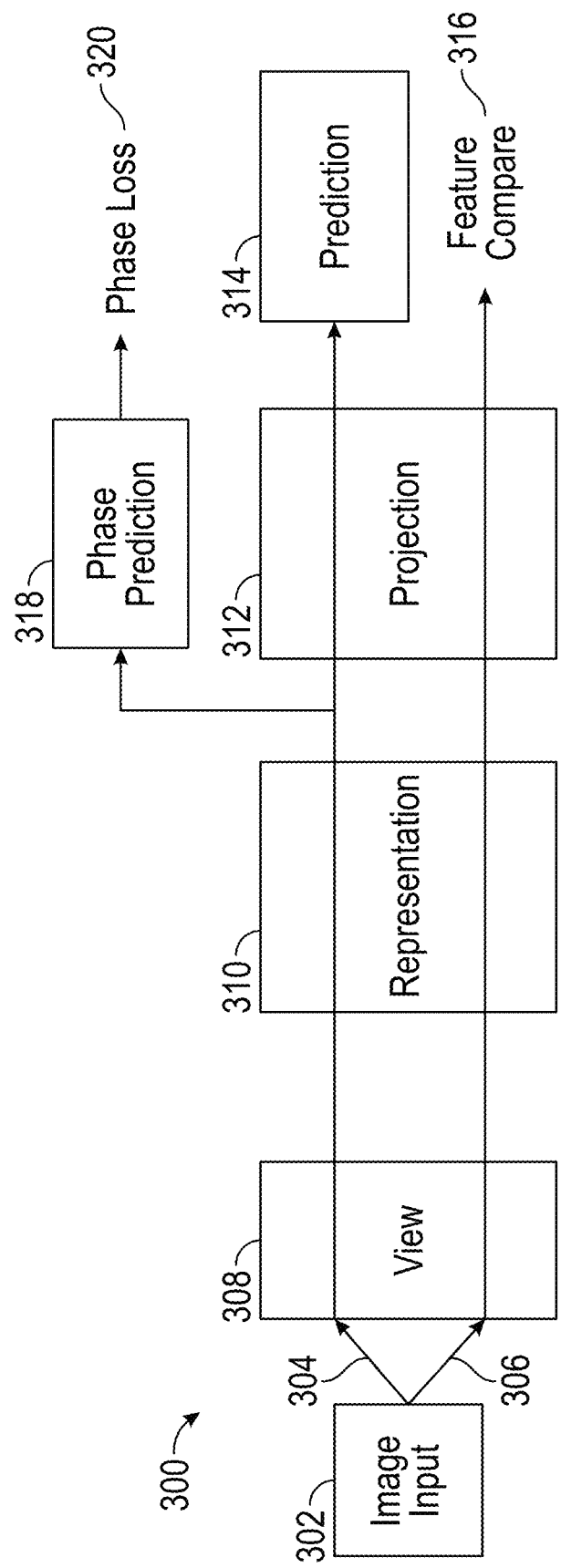
FIG. 3 depicts a flow diagram according to one or more aspects.

FIG. 3 depicts a flow diagram 300 according to one or more aspects. The flow diagram 300 is an example of a self-supervised approach to enhance encoders for surgical workflow recognition. The training process depicted in the flow diagram 300 can be used to train the encoder 204 of FIG. 2 or other encoders for various types of features. In aspects, extra supervision can be added on a self-supervised manner during training of encoders for surgical workflow recognition (SWR). Self-supervised approaches can use unlabeled data to train models. Many such methods are based on feature distance minimization or pretext tasks that can lead to better representations for downstream tasks. The objective of SWR is to split a video into chunks that correspond to the surgical phase/objective of a procedure. It can be a challenging task due to the low availability of data and the difficulties annotating data. Furthermore, the high similarity of scenes and actions throughout a video can lead to ambiguous predictions. Thus, it is important to extract robust frame features to build a reliable model.

Figure 5:
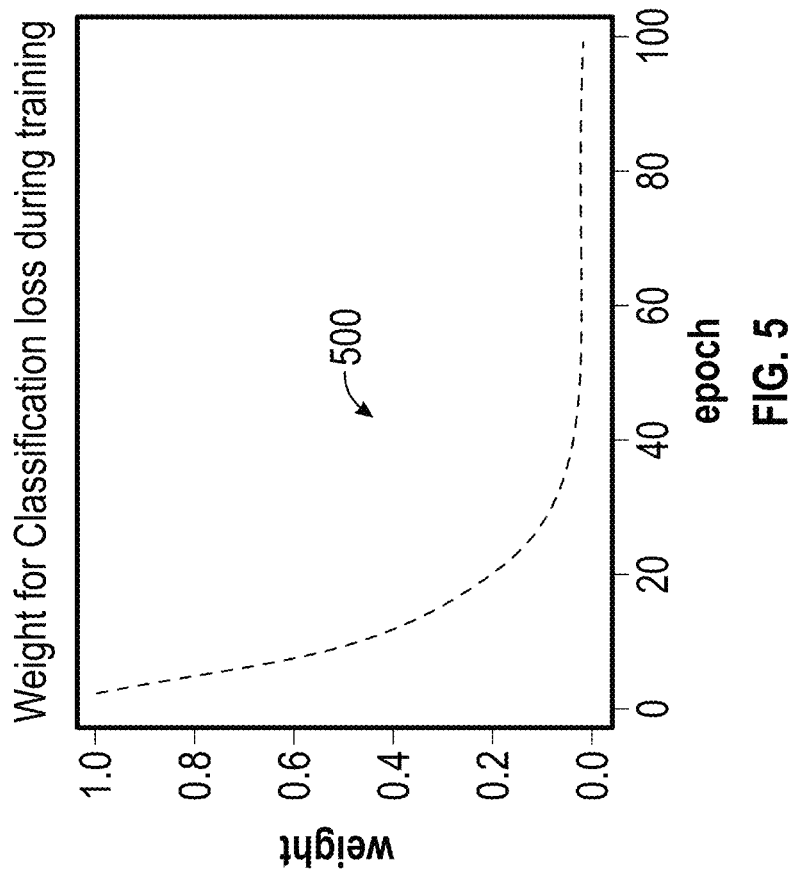
FIG. 5 depicts a weighting function according to one or more aspects.

Aspects can include a teacher-student approach to facilitate and improve training of convolutional neural network (CNN) models. In the example of FIG. 3, a model 301 can include two parallel networks that learn from each other: a student network 304 attempts to predict from an augmented image and a target signal generated by the teacher network 306 for the same image 302 under different augmentation. Augmentation can include various types of changes, such as rotation, brightness adjustment, rescaling, cropping, blurring, and/or various filters. The student network 304 can be updated through backpropagation, while an exponential moving average can be used to update the teacher network 306. Phase labels can also be utilized to update the student network 304. As the training progresses, the contribution of phase supervision can be decreased, for instance, according to weighting function 500 of FIG. 5 that reduces over multiple epochs. View 308, representation 310, and projection 312 can be applied to both the student network 304 and the teacher network 306, with a prediction 314 performed after projection 312 on the student network 304 with feature compare 316 performed with respect to the teacher network 306 to determine how well the student network 304 performs. A phase prediction 318 can follow the representation 310 computation to determine a phase loss 320. The phase prediction 318 can be used for training the encoder 204 of FIG. 2 for surgical phase feature classification, for example. The phase loss 320 can be used for model fitting. The general aspects of the student network 304 and the teacher network 306 can work well for larger scale scene changes. However, in surgical transitions, the changes of scene can be on a smaller scale, such as a change in instrument or surgical action with similar background features. The phase prediction 318 can be tuned to detect small differences to distinguish phases and form classification head images for bootstrapping or further training for specific surgical phase sequences. Changes to the shape of the weighting function 500 can impact the learning rate policy. To avoid phase loss domination in training, the weighting function 500 can be used to decrease the effect of phase loss 320, for instance, where a loss function=feature loss+W*phase loss. The phase prediction 318 with phase loss 320 can be a head added to jointly train for phase and feature robustness.

Aspects support model training on a self-supervised task, reducing the risk of overfitting and helping the model to build stronger representations by forcing feature consistency across different augmentation. Once training is converged, the teacher network 306 can be discarded, and the student network 304 can be used to extract concise spatial features.

Figure 6:
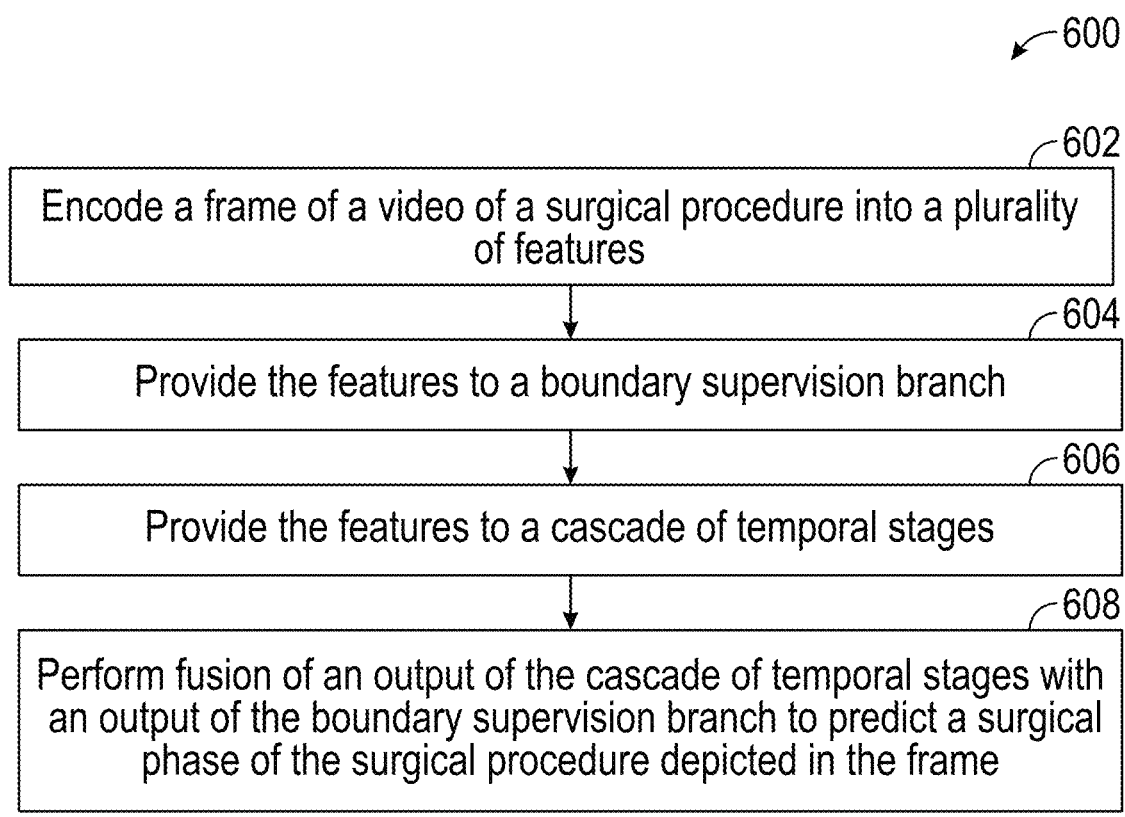
FIG. 6 depicts a flowchart of a method according to one or more aspects.

FIG. 6 depicts a flowchart of a method 600 for surgical phase recognition using a boundary aware cascade stage network according to one or more aspects. The method 600 can be executed by the system 100 of FIG. 1 as a computer-implemented method or another such computer system (e.g., computer system 800 of FIG. 7) in a training environment that uses surgical data.

The method 600 can include additional steps beyond those depicted in the example of FIG. 6. The method 600 can include identifying, autonomously, a surgical phase in a video of a surgical procedure using a boundary aware cascade stage network to perform surgical phase recognition, for instance, according to blocks 602, 604, 606, and 608. At block 602, the system 100 can encode a frame of the video of a surgical procedure into a plurality of features. At block 604, the system 100 can provide the features to a boundary supervision branch of a model. At block 606, the system 100 can provide the features to a cascade of temporal stages of the model. At block 608, the system 100 can perform fusion of an output of the cascade of temporal stages with an output of the boundary supervision branch to predict the surgical phase of the surgical procedure depicted in the frame.

In aspects, the cascade of temporal stages can include a dilated convolution stage in series with one or more reweighted dilated convolution stages. The boundary supervision branch can be trained to detect a transition condition between the surgical phases. The boundary supervision branch can be trained in parallel with the cascade of temporal stages according to a loss function that changes over a plurality of epochs for both the boundary supervision branch and the cascade of temporal stages. In some aspects, the frame can be encoded by an encoder trained using self-supervised learning. The self-supervised learning can include a student network that attempts to predict from an augmented image and a target signal generated by a teacher network for a same image under different augmentation. In some aspects, only the student network may be updated through backpropagation, while an exponential moving average is used to update the teacher network, and phase labels are used to update the student network. A contribution of phase supervision can be reduced as training progresses according to a classification loss function. The video of the surgical procedure can be captured by an endoscopic camera from inside of a patient's body. In some aspects, the video of the surgical procedure is captured by a camera from outside of a patient's body.

A computer program product can include a memory device with computer-readable instructions stored thereon, where executing the computer-readable instructions by one or more processing units causes the one or more processing units to identify, autonomously, a surgical phase in a video of a surgical procedure using a boundary aware cascade stage network to perform surgical phase recognition and an encoder trained using self-supervised learning. The computer program product can implement other processes as described throughout the disclosure.

Figure 7:
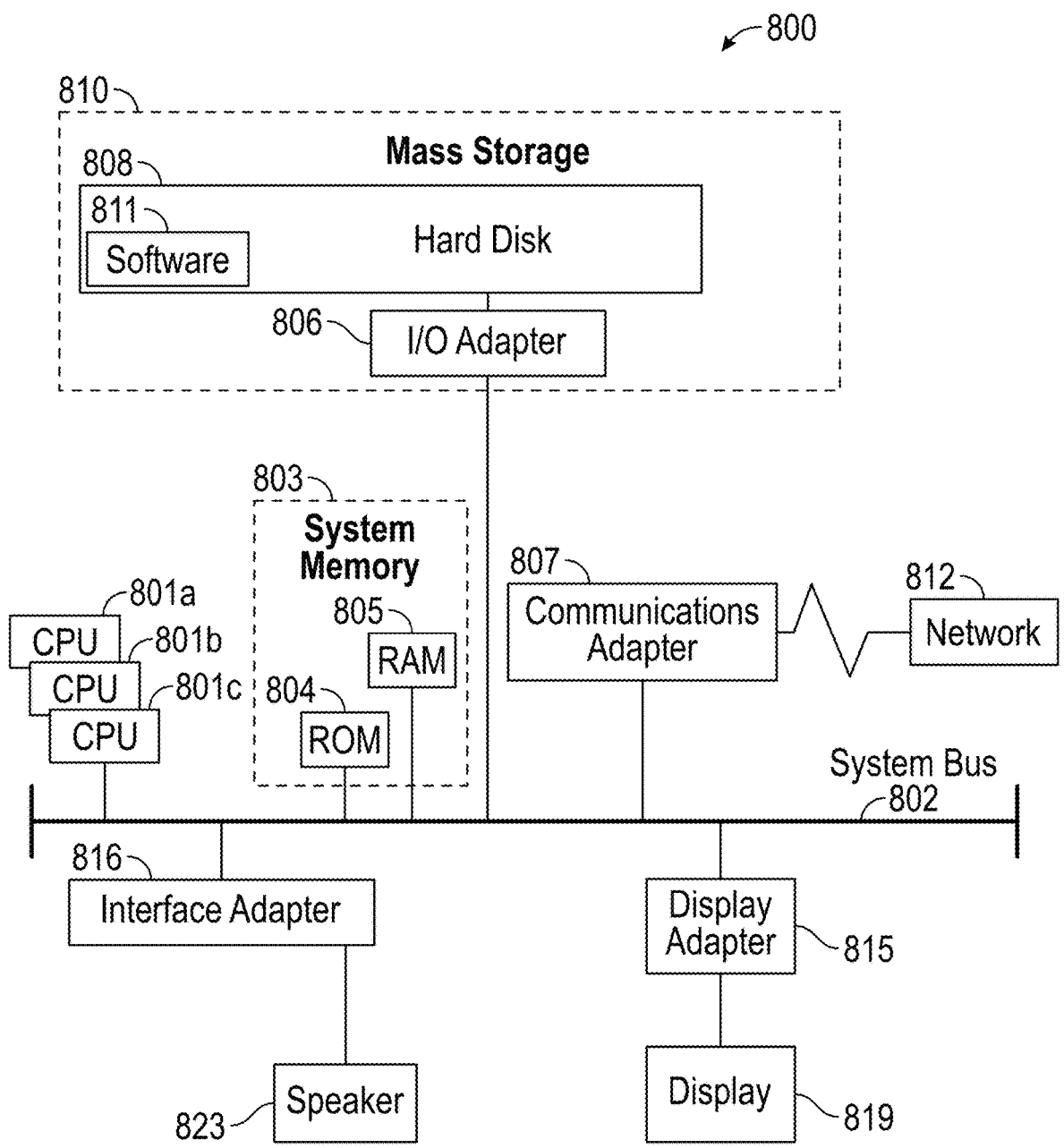
FIG. 7 depicts a computer system in accordance with one or more aspects.

Turning now to FIG. 7, a computer system 800 is generally shown in accordance with an aspect. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 7, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include one or more memory devices, such as a read-only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read-only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described hereinbelow with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one aspect, a portion of the system memory 803 and the mass storage 810 collectively store an operating system, which may be any appropriate operating system to coordinate the functions of the various components shown in FIG. 7.

Additional input/output devices are shown as connected to the system bus 802 via a display adapter 815 and an interface adapter 816 and. In one aspect, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics-intensive applications and a video controller. A keyboard, a mouse, a touchscreen, one or more buttons, a speaker, etc., can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 800 includes processing capability in the form of the processors 801, and storage capability including the system memory 803 and the mass storage 810, input means such as the buttons, touchscreen, and output capability including the speaker 823 and the display 819.

In some aspects, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external web server or a cloud computing node.

It is to be understood that the block diagram of FIG. 7 is not intended to indicate that the computer system 800 is to include all of the components shown in FIG. 7. Rather, the computer system 800 can include any appropriate fewer or additional components not illustrated in FIG. 7 (e.g., additional memory components, embedded controllers, modules, additional network interfaces, etc.). Further, the aspects described herein with respect to computer system 800 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various aspects.

The technical solutions described herein can use endoscopic video of the surgical procedure in one or more examples. In other examples, the technical solutions described herein use open surgery video, for example, with cameras mounted on the surgeon's head. Cameras can be mounted at various other locations around the operating room in other examples.

The examples described herein can be performed using a computer such as a server computer, a desktop computer, a tablet computer, etc. In one or more examples, the technical solutions herein can be implemented using cloud computing technology.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present invention have been presented for purposes of illustration but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects described herein.

Various aspects of the invention are described herein with reference to the related drawings. Alternative aspects of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains," or "containing," or any other variation thereof are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any aspect or design described herein as "exemplary" is not necessarily to be construed as preferred or advantageous over other aspects or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), graphics processing units (GPUs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A system comprising:
    a memory device; and
    one or more processors coupled with the memory device, the one or more processors configured to:
        encode a frame of a video of a surgical procedure into a plurality of features;
        provide the features to a boundary supervision branch of a model;
        provide the features to a cascade of temporal stages of the model, wherein the cascade of temporal stages comprises a dilated convolution stage in series with one or more reweighted dilated convolution stages; and
        perform fusion of an output of the cascade of temporal stages with an output of the boundary supervision branch to predict a surgical phase of the surgical procedure depicted in the frame.

2. The system of claim 1, wherein the boundary supervision branch is trained to detect a transition condition between surgical phases.

3. The system of claim 2, wherein the boundary supervision branch is trained in parallel with the cascade of temporal stages according to a loss function that changes over a plurality of epochs.

4. The system of claim 1, wherein the frame is encoded by an encoder trained using self-supervised learning.

5. The system of claim 4, wherein the self-supervised learning comprises a student network that attempts to predict from an augmented image and a target signal generated by a teacher network for a same image under different augmentation, wherein only the student network is updated through backpropagation, while an exponential moving average is used to update the teacher network.

6. The system of claim 5, wherein phase labels are used to update the student network and a contribution of phase supervision is reduced as training progresses according to a classification loss function.

7. The system of claim 1, wherein the video of the surgical procedure is captured by an endoscopic camera from inside of a patient's body.

8. The system of claim 1, wherein the video of the surgical procedure is captured by a camera from outside of a patient's body.

9. A computer-implemented method comprising:
    encoding a frame of a video of a surgical procedure into a plurality of features;
    providing the features to a boundary supervision branch of a model;
    providing the features to a cascade of temporal stages of the model, wherein the cascade of temporal stages comprises a dilated convolution stage in series with one or more reweighted dilated convolution stages, and the boundary supervision branch is trained to detect a transition condition between surgical phases; and
    performing fusion of an output of the cascade of temporal stages with an output of the boundary supervision branch to predict the surgical phase of the surgical procedure depicted in the frame.

10. The method of claim 9, wherein the boundary supervision branch is trained in parallel with the cascade of temporal stages according to a loss function that changes over a plurality of epochs for both the boundary supervision branch and the cascade of temporal stages.

11. The method of claim 10, wherein the frame is encoded by an encoder trained using self-supervised learning.

12. The method of claim 11, wherein the self-supervised learning comprises a student network that attempts to predict from an augmented image and a target signal generated by a teacher network for a same image under different augmentation.

13. The method of claim 12, wherein only the student network is updated through backpropagation, while an exponential moving average is used to update the teacher network, and phase labels are used to update the student network.

14. The method of claim 13, wherein a contribution of phase supervision is reduced as training progresses according to a classification loss function.

15. The method of claim 9, wherein the video of the surgical procedure is captured by an endoscopic camera from inside of a patient's body.

16. The method of claim 9, wherein the video of the surgical procedure is captured by a camera from outside of a patient's body.

17. A computer program product comprising a non-transitory memory device with computer-readable instructions stored thereon, wherein executing the computer-readable instructions by one or more processing units causes the one or more processing units to perform a plurality of operations comprising:

encoding a frame of a video of a surgical procedure into a plurality of features, wherein the features comprise one or more structures and/or events in the surgical procedure;

providing the features to a boundary supervision branch trained to detect a transition between surgical phases;

providing the features to a cascade of temporal stages of a model configured to adjust a weight for one or more frames based on a confidence score from a previous stage; wherein the cascade of temporal stages comprises a dilated convolution stage in series with one or more reweighted dilated convolution stages; and performing fusion of an output of the cascade of temporal stages with an output of the boundary supervision branch to predict the surgical phase of the surgical procedure depicted in the frame.

18. The computer program product of claim 17, wherein the boundary supervision branch is trained in parallel with the cascade of temporal stages according to a loss function that changes over a plurality of epochs.

* * * * *